（12） United States Patent
Shibamoto et al.

(10) Patent No.: US 7,137,563 B2
(45) Date of Patent: Nov. 21, 2006

(54) METHOD FOR MAKING IC CARD (75) Inventors: Goro Shibamoto, Kanagawa (JP);
Osamu Ishii, Kanagawa (JP); Kazumi Izumitani, Chiba (JP); Koji Hayasaka, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/811,933

(22) Filed: Mar. 30, 2004

(65) Prior Publication Data

US 2004/0245347 A1  Dec. 9, 2004

(30) Foreign Application Priority Data

Apr. 10, 2003 (JP) ............................. 2003-105944

(51) Int. Cl.
*G06K 19/00* (2006.01)
(52) U.S. Cl. ...................................... 235/487; 235/492
(58) Field of Classification Search ............... 235/487, 235/492
See application file for complete search history.

(56) References Cited

U.S. PATENT DOCUMENTS

| 6,378,774 | B1 * | 4/2002 | Emori et al. ................. 235/492 |
| 6,460,773 | B1 * | 10/2002 | Kaiya et al. ................. 235/492 |
| 6,601,770 | B1 * | 8/2003 | Ikefuji et al. ................ 235/492 |
| 6,634,564 | B1 * | 10/2003 | Kuramochi .................. 235/492 |
| 6,637,664 | B1 * | 10/2003 | Yoshigi et al. .............. 235/492 |
| 2002/0162894 | A1 | 11/2002 | Kuramochi |
| 2002/0170974 | A1 * | 11/2002 | Kashima ..................... 235/492 |

* cited by examiner

*Primary Examiner*—Karl D. Frech
(74) *Attorney, Agent, or Firm*—Oblon, Spivak, McClelland, Maier & Neustadt, P.C.

(57) ABSTRACT

A method for making a combination IC card comprising the steps of forming antenna leads and patterned connection leads, forming a hole for mounting an external electrode chip on a sheath on at least one side of the antenna substrate, mounting an IC chip on the antenna substrate having the antenna leads and the patterned connection leads, mounting the external electrode chip on the antenna substrate having the antenna leads and the patterned connection leads, and attaching the sheath having the hole on the antenna substrate.

7 Claims, 7 Drawing Sheets

(A) STEP 1

(B) STEP 2

(C) STEP 3

(D) STEP 4

FIG. 6

(E) STEP 5

(F) STEP 6

FIG. 7

METHOD FOR MAKING IC CARD

BACKGROUND OF THE INVENTION

1. Field of the Invention

The present invention relates to a method for making an IC card. More specifically, the invention relates to a method for making an IC card functioning as both a contact IC card and a non-contact IC card. A contact IC card receives electric power and signals via an electric contact, and a non-contact IC card receives electric power and signals by electromagnetic coupling without forming an electric contact.

2. Description of the Related Art

An IC card including an IC chip has a large memory capacity and high security compared to a known magnetic stripe card and is widely used in the financial and transportation industries.

In general, two types of IC cards are known: a non-contact IC card and a contact IC card. The former may be used in the transportation industry as a commuter pass, and the latter may be used in the finance industry as a credit card complying with expected monetary value standards. Such IC cards have different specifications according to their intended purposes.

Under such circumstances, an IC card known as a dual interface card has drawn attention. A dual interface card is an IC card functioning as both a contact IC card and a non-contact IC card. When the IC card functions as a contact IC card, it can be used, for example, as a credit card. When the IC card functions as a non-contact IC card, it can be used, for example, as a commuter pass. Thus, one dual interface card may conveniently be used for two different purposes.

The dual interface card includes two different types: a combination card that operates with one IC chip and a hybrid card that operates with two or more IC chips. Because of problems related to mounting the IC chip onto a card, the combination card that can be operated with one IC chip has attracted attention.

Such a combination card has an external electrode chip (or a tape automated bonding (TAB) chip), which is for connection with an external read/write apparatus for controlling the functions as a contact IC card, buried in a card substrate. The combination card also has antenna leads for controlling the functions as a non-contact IC card. Moreover, the card substrate has patterned leads for connecting the IC chip with the external electrode chip and the antenna leads.

A known combination card can be produced according to a method in Japanese Unexamined Patent Application Publication No. 2001-155128. In this method for making an IC card, first, an antenna sheet with antenna leads for non-contact communication is interposed between card substrates, and the entire card is laminated. Then, a hole for mounting a TAB chip is formed on one of the card substrates by spot facing. By forming the hole, the patterned leads for connecting the TAB chip are exposed. Subsequently, the TAB chip is buried in the hole to electrically connect the TAB chip and the patterned leads.

SUMMARY OF THE INVENTION

When the IC card is laminated (heat-sealed), the thickness of the card substrate changes. Accordingly, the distance from the outer surface to the inner surface of the spot faced card substrate, i.e., from the outer surface of the card to the surface of the wiring patterns, varies. As a result, when the card is spot faced, the patterned leads on the card might not be exposed sufficiently or, contrarily, the patterned leads might be scraped off, causing failure in the electric connection with the TAB chip.

Furthermore, it is technically difficult to evenly spot face the surface of the card substrate to bury the TAB chip, and, as a result, portions of the card substrate remain because of failure of spot facing. In such a case, the bond between the TAB chip and the card substrate becomes weak.

An object of the present invention is to provide a method for making an IC card having a highly reliable electric and mechanical connection for an external electrode chip (TAB chip) for contact communication.

A method for making an IC card according to the present invention is provided. The IC card comprises a card body having an antenna substrate with antenna leads for non-contract communication, an external electrode chip buried in the card body so that the external electrode chip for contact communication is exposed on the surface of the card body, and an IC chip electrically connected to the antenna substrate and the external electrode chip via patterned connection leads on the antenna substrate. The method for making the IC card comprises the following steps of forming the antenna leads and the patterned connection leads on the antenna substrate, forming a hole on a sheath disposed on at least one o the surfaces of the antenna substrate for mounting the external electrode chip on the antenna substrate, mounting the IC chip on the antenna substrate having the antenna leads and patterned connection leads, mounting the external electrode chip on the antenna substrate having the antenna leads and patterned connection leads, and disposing the sheath having the hole.

In the present invention, a hole is formed in the sheath for mounting an external electrode chip. Then, the external electrode chip is mounted on the antenna substrate before or after the sheath is disposed on the antenna substrate.

In this way, the external electrode chip can be mounted on the antenna substrate without spot facing a hole for the external electrode chip on the sheath attached to the antenna substrate. Thus, the reliability of the electrical and mechanical connections between the external electrode chip and the antenna substrate can be improved.

The order of the step of attaching the sheath having the hole for mounting the external electrode chip on the antenna substrate and the step of mounting the external electrode chip on the antenna substrate are interchangeable. In other words, the sheath may be disposed on the antenna substrate after mounting the external electrode chip on the antenna substrate or the external electrode chip may be mounted on the antenna substrate through the hole after disposing the sheath on the antenna substrate.

The external electrode chips may have protrusion terminals electrically connected to the patterned connection leads on the surface opposite to the surface having the external electrode.

By contacting the projection terminals with the patterned connection leads, the reliability and usability of the electrical connection improves.

As described above, according to the method for making an IC card according to the present invention, an IC card having highly reliable electric and mechanical connections of the external electrode chip (TAB chip) for contact communication can be provided.

DESCRIPTION OF THE PREFERRED EMBODIMENTS

An embodiment of the present invention is described below by referring to drawings.

Figure 1:
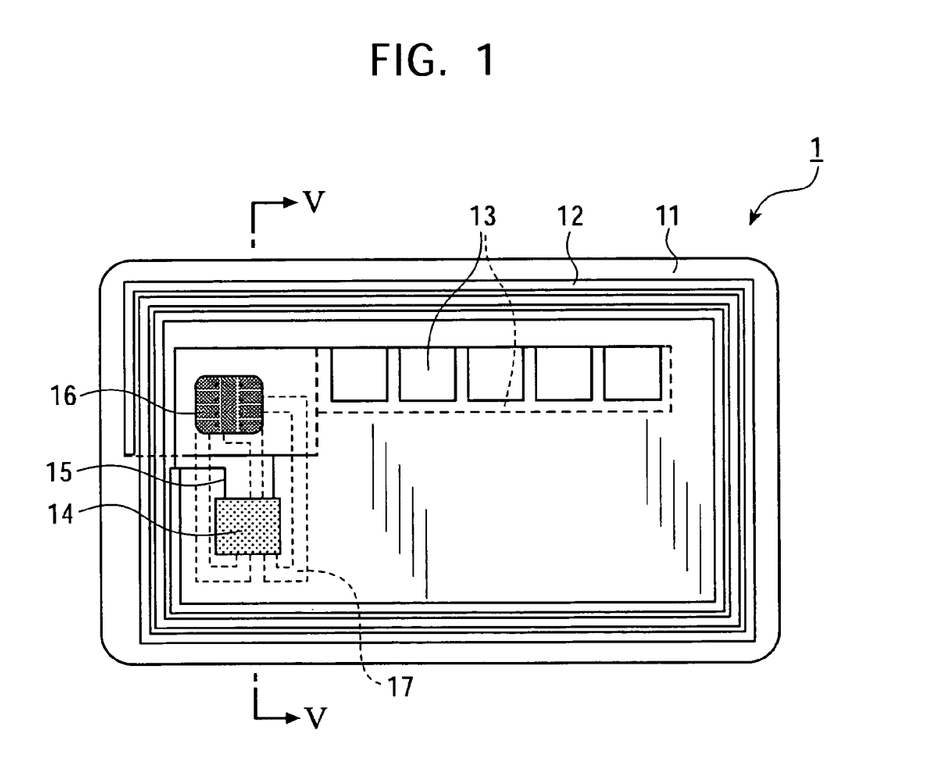
FIG. 1 is a front view of an IC card according to an embodiment of the present invention.
Figure 2:
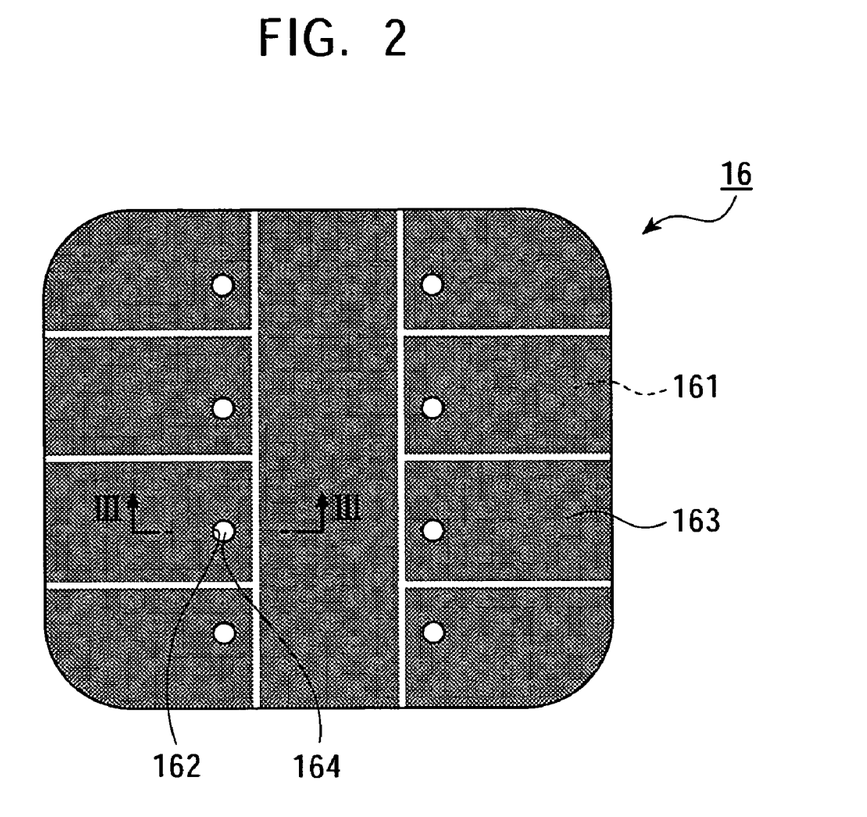
FIG. 2 is a front view of an external electrode chip according to an embodiment of the present invention.
Figure 3:
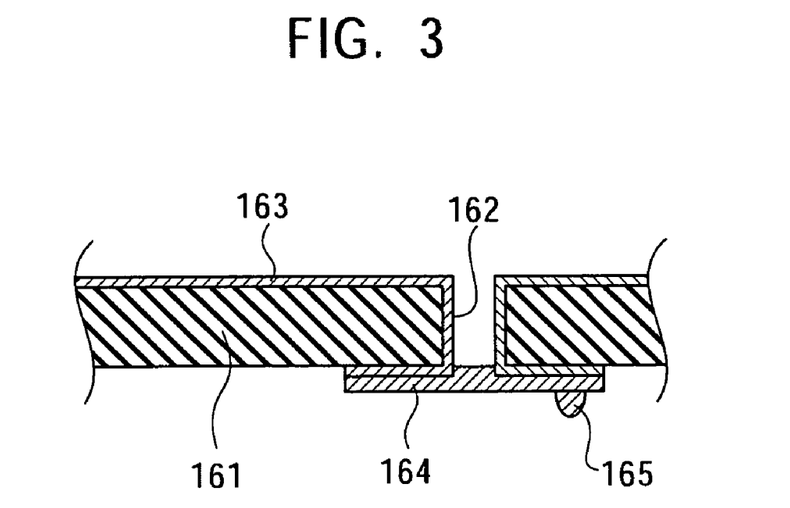
FIG. 3 is cross-sectional view taken along line III—III in FIG. 2 of an external electrode chip according to an embodiment of the present invention.
Figure 4:
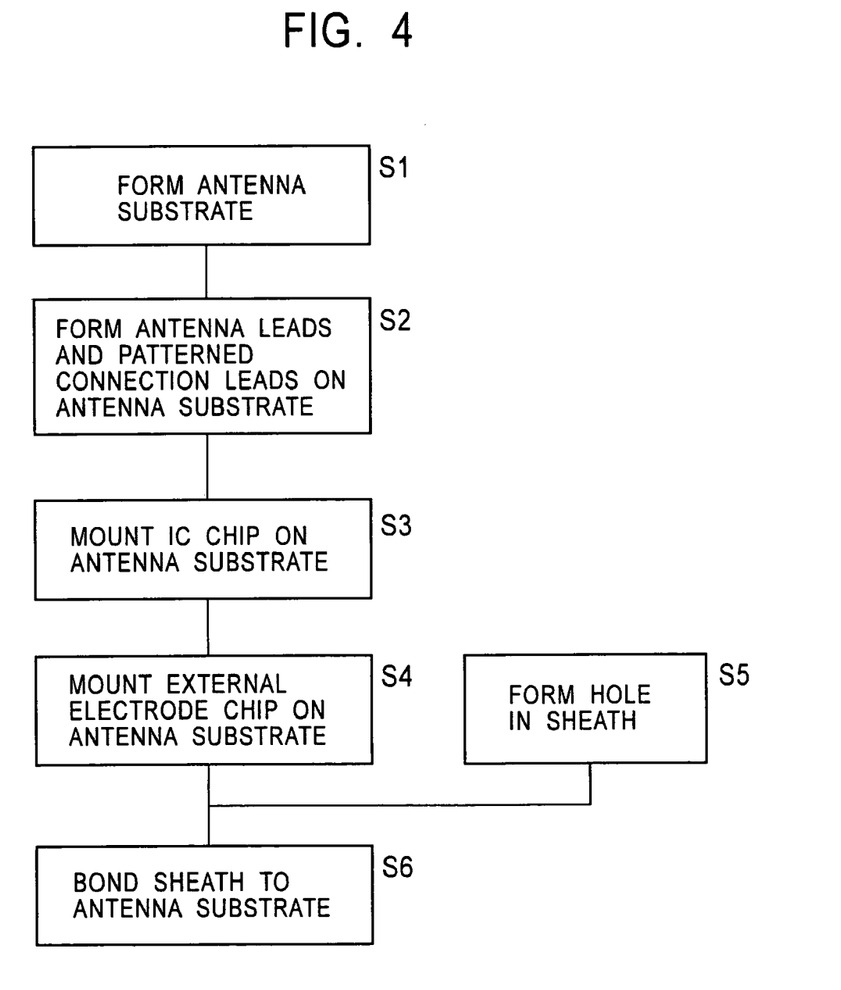
FIG. 4 is a process drawing of a method for making an IC card according to an embodiment of the present invention.

FIG. 1 is a front view of an IC card according to an embodiment of the present invention. FIG. 2 is a front view of an external electrode chip according to an embodiment of the present invention. FIG. 3 is cross-sectional view taken along line III—III in FIG. 2 of an external electrode chip according to an embodiment of the present invention. FIG. 4 is a process drawing of a method for making an IC card according to an embodiment of the present invention. FIGS. 5A to 5C and FIGS. 6E and 6F are cross-sectional views taken along line V—V in FIG. 1 illustrating a method for making an IC card according to an embodiment of the present invention. FIG. 7 is an equivalent circuit diagram of an IC card according to an embodiment of the present invention.

The structure of an IC card 1 according to this embodiment is described by referring to FIGS. 1, 2, 6F and 7.

The IC card 1 according to this embodiment is a combination card, as described above, functioning as both a contact IC card and a non-contact IC card and being operated by one IC chip package 14. As shown in the equivalent circuit diagram in FIG. 7, for contact communication, an external electrode chip 16 in contact with an external read/write apparatus for controlling the contact communication is electrically connected to the IC chip package 14 via patterned connection leads 17. On the other hand, for non-contact communication, antenna leads 12 are electrically connected to the IC chip package 14 via a patterned connection leads 15. In this way, the IC card 1 functions as both a contact and non-contact IC card by using one IC chip package 14.

As shown in FIG. 6F, a card body 11 is composed of an electric insulation antenna substrate 111, patternable conductive layers 112 and 113, adhesive sheets 19a and 19b, and sheaths 18a and 18b. The antenna substrate 111 is interposed between the patternable conductive layers 112 and 113, the adhesive sheet 19a is interposed between the patternable conductive layer 112 and the sheath 18a, and the adhesive sheet 19b is interposed between the patternable conductive layer 113 and the sheath 18b.

The antenna substrate 111 is composed of a mechanically strong material with high heat resistance such as polyimide. The antenna substrate 111, however, may also be composed of polymeric esters such as glass epoxy, polyethylene terephthalate, or polyethylene naphthalate. The patternable conductive layers 112 and 113 are composed of copper, aluminum, an alloy including copper, or an alloy including aluminum. The adhesive sheets 19a and 19b are composed of a sheet of hotmelt or polyethylene terephthalate glycol. The sheaths 18a and 18b are composed of a composite sheet of polybutylene terephthalate and polycarbonate.

The antenna leads 12, a part of a capacitor 13, and the patterned connection leads 15 and 17 depicted in the front view of the IC card 1 illustrated in FIG. 1 and the equivalent circuit diagram illustrated in FIG. 7 are etched on the above-mentioned patternable conductive layer 112. The rest of the capacitor 13 is formed on the patternable conductive layer 113 on the other side of the antenna substrate 111. In the front view illustrated in FIG. 1, the capacitor 13 formed on the patternable conductive layer 112 is indicated with a solid line, and the capacitor 13 formed on the patternable conductive layer 113 is indicated with a dotted line. The capacitor 13 of this embodiment is a film capacitor including the electric insulation antenna substrate 111 as a dielectric layer. The capacitor 13 is structured by disposing an electrode on each patternable conductive layer 112 and 113 with the antenna substrate 111 interposed therebetween.

The IC chip package 14 is electrically connected to the patterned connection leads 15 and 17 on the antenna substrate 111 by mounting a flip chip as shown in FIG. 1. In FIG. 6F, the actual IC chip is indicated by the reference numeral 141. The IC chip package 14 in this embodiment is composed of the IC chip 141 sealed together with a metal plate 143 with a sealing resin 142, as shown in FIG. 1. The metal plate 143 protects the IC chip 141 from external forces and is composed of, for example, a circular stainless plate with a thickness of 20 to 200 µm (preferably 30 to 150 µm). When the thickness of the metal plate 143 is 30 µm or less, the strength decreases and the IC chip 141 is damaged due to bending. When the thickness of the metal plate 143 is 150 µm or more, the antenna substrate 111 cannot be disposed in the middle of the width of the card and, thus, the card warps, causing a reduction in yield. In the embodiment illustrated in the drawing, the metal plate 143 is disposed only on one side of the IC card 1. The same metal plate, however, may be disposed on the other side (lower side in the drawing) of the IC chip 141. In this way, the IC chip 141 is interposed between two metal plates 143 and the mechanical strength is improved.

Details of the external electrode chip 16 are illustrated in FIGS. 2 and 3. As shown in FIGS. 1 and 6F, the external electrode chip 16 is buried in the sheath 18a with an adhesive so that external electrodes 163 are exposed on one of the surfaces of the IC card 1. The external electrode chip 16 physically contacts and communicates with an external read/write apparatus. The external electrode chip 16, as shown in FIG. 3, is composed of an insulating substrate 161 composed of, for example, glass epoxy having at least one surface coated with a gold conductive film functioning as the external electrodes 163. The external electrodes 163 are electrically connected with conductive layers 164 disposed on the other side of the insulating substrate 161 via through holes 162. Bumps (protruding terminals) 165 formed on the conductive layers 164 are connected to the patterned connection leads 17 (cf. FIG. 1) on the antenna substrate 111 of the IC card 1 to electrically connect the external electrode chip 16 to the IC chip package 14. The bumps 165 may be metal stud bumps, ball bumps, or electroless/electrolytic plating bumps.

Figure 5:
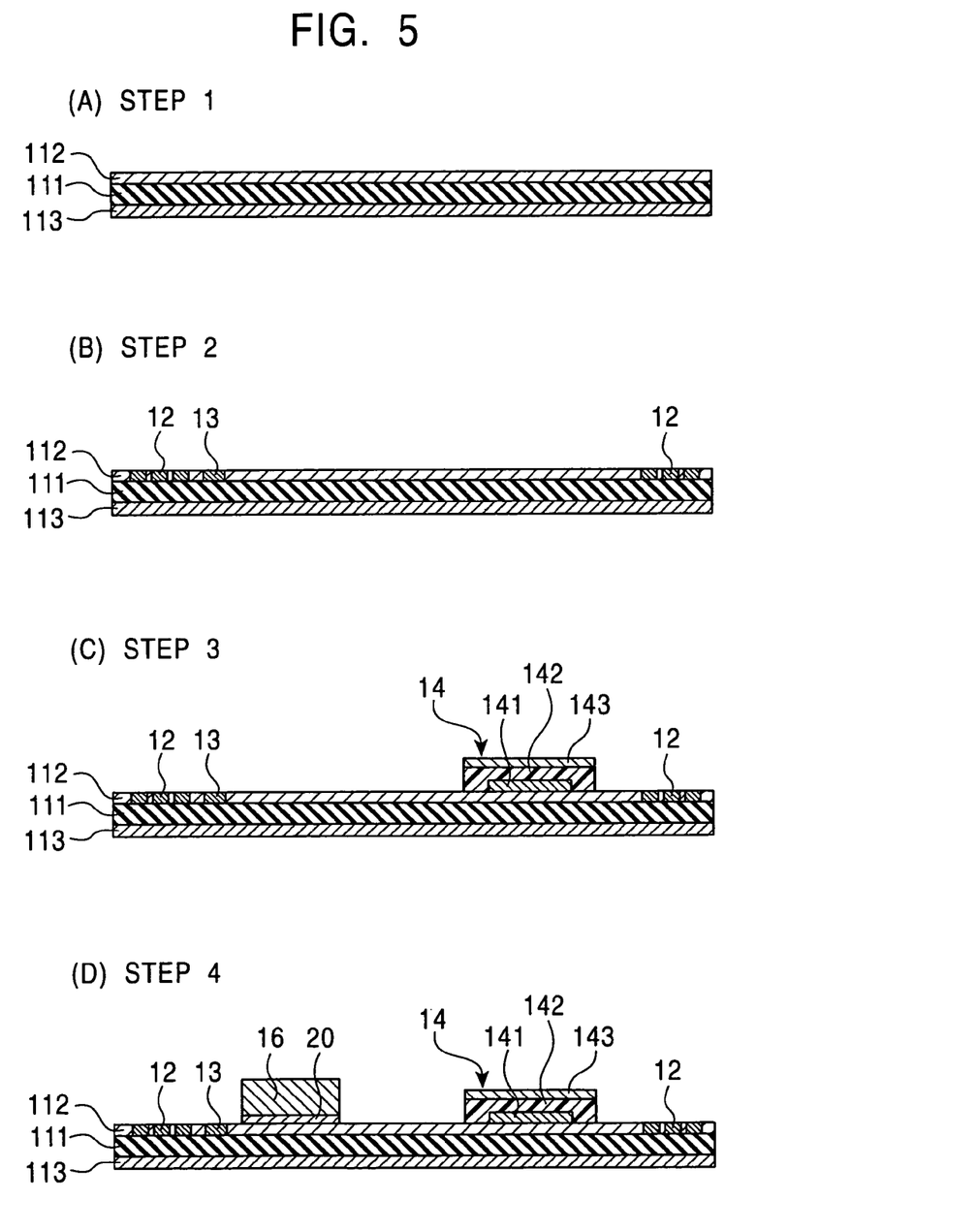
FIGS. 5A to 5D are cross-sectional views taken along line V—V in FIG. 1 illustrating a method for making an IC card according to an embodiment of the present invention.
Figure 6:
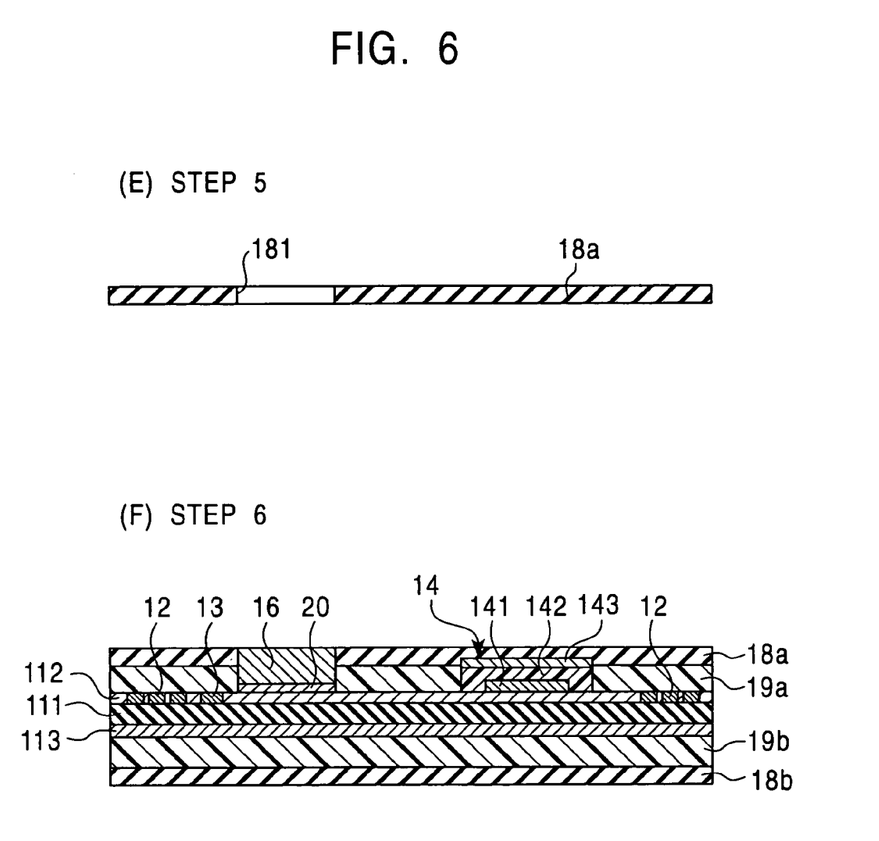
FIGS. 6E and 6F are cross-sectional views taken along line V—V in FIG. 1 illustrating a method for making an IC card according to an embodiment of the present invention.
Figure 7:
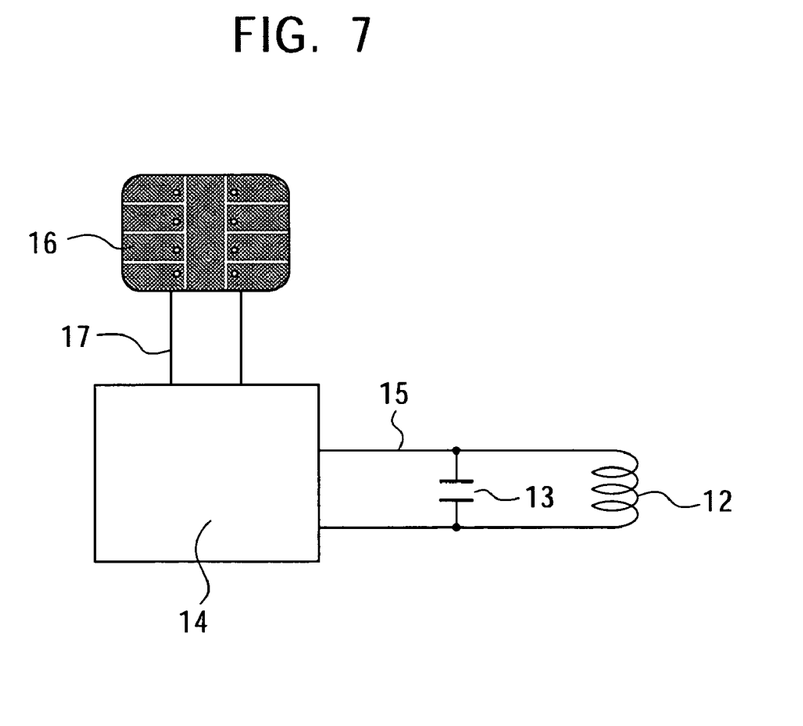
FIG. 7 is an equivalent circuit diagram of an IC card according to an embodiment of the present invention.

The method for making an IC card according to the above-mentioned embodiment is described by referring to FIGS. 4 to 6.

In step 1 depicted in FIGS. 4 and 5A, the antenna substrate 111 composed of a polyimide sheet is interposed between the conductive pattern layers 112 and 113 composed of copper foil to form a base material. In step 2 depicted in FIGS. 4 and 5B, predetermined areas of the conductive pattern layer 112 on one side of the base material are etched to form antenna leads 12, a part of the capacitor 13, and patterned connection leads 15 and 17, as shown in FIG. 5B. The other part of the capacitor 13 is formed on the conductive pattern layer 113 on the other side of the base material. The part of the capacitor 13 on the conductive pattern layer 113 is electrically connected to the patterned connection leads 15 via through holes.

In step 3 depicted in FIG. 5C, the IC chip 141 for the antenna substrate 111 is mounted by flip chip bonding. After mounting the IC chip 141, the sealing resin 142 such as heat-curable epoxy adhesive is applied over the IC chip 141. The metal plate 143 such as a stainless plate is disposed on the IC chip 141, and, then, the sealing resin 142 is dried for a predetermined time at a predetermined temperature. To suppress the heat contraction of the sealing resin 142 when it cures, it is preferable to add a bulking agent composed of nonconductors such as aluminum and titanium oxide to the sealing resin 142.

In step 4 depicted in FIG. 5D, the external electrode chip 16 is bonded on a predetermined position of the patterned connection leads 17 on the antenna substrate 111. When bonding the external electrode chip 16, both the electrical connection and physical bonding must be sufficient. Sufficient physical bonding can be achieved by using an adhesive 20 to bond the surface of the external electrode chip 16 having the conductive layers 164 to the antenna substrate 111. By using this bonding method, the external electrode chip 16 and the antenna substrate 111 can be bonded together by using an anisotropic conductive film (ACF). The film, however, is not limited to a specific type and/or material, providing that it is capable of bonding the external electrode chip 16 and the antenna substrate 111.

To achieve an electrical connection, the external electrode chip 16 is disposed on the antenna substrate 111 so that the bumps 165 formed on the conductive layers 164 are buried in predetermined positions on the patterned connection leads 17 of the antenna substrate 111 when the external electrode chip 16 and the antenna substrate 111 are bonded. In this way, an electrical connection is achieved. However, the method for achieving an electrical connection is not limited to this method using the bumps 165, providing that the external electrode chip 16 and the antenna substrate 111 are electrically connected.

Step 3 for mounting the IC chip package 14 and step 4 for mounting the external electrode chip 16 do not necessarily have to be carried out in sequence. The external electrode chip 16 may be mounted first or at the same time as the IC chip package 14. This is because the IC chip package 14 and the external electrode chip 16 are mounted in different positions on the antenna substrate 111 and do not interfere with each other.

After mounting the IC chip package 14 and the external electrode chip 16, the capacitor 13 formed on the conductive pattern layers 112 and 113 is trimmed. The capacitor 13 is trimmed for setting the resonance frequency of the non-contact communication for the finished IC card 1 to 13.56 MHz. The trimming is preferably performed with the IC chip package 14 and the external electrode chip 16 mounted.

This is because the IC chip package 14 has a parasitic capacitance that causes the capacitance to change and resultantly causes the resonance frequency to change.

At about the same time, in step 5 depicted in FIG. 6E a hole 181 is formed on the sheath 18a composed of an unstretched polyethylene terephthalate sheet for mounting the external electrode chip 16. The hole 181 is shaped as the same as the outer diameter of the external electrode chip 16. The other sheath 18b does not have a hole.

In the final step 6, on the surface of the antenna substrate 111 with the IC chip package 14 and the external electrode chip 16 prepared in step 4, the adhesive sheet 19a is disposed. On the other surface of the antenna substrate 111, the adhesive sheet 19b is disposed. On the adhesive sheets 19a and 19b, the sheaths 18a and 18b prepared in step 5 are attached, respectively. Then the entire layered structure is heat-sealed to prepare a card. It is preferable to compose each sheath 18a and 18b and each adhesive sheet 19a and 19b with the same materials having the same thickness. If the IC card includes different materials with different thicknesses in the width direction, the IC card might warp.

According to the method for making an IC card of this embodiment, the external electrode chip 16 is mounted on the exposed patterned connection leads 17. Therefore, insufficient or excess scraping of the sheath due to spot facing, as described in the known method in patent document 1, does not occur. Consequently, not only the electrical connection between the external electrode chip 16 and the patterned connection leads 17 (and by extent, the antenna substrate 111) becomes highly reliable, but also the mechanical bonding between the two becomes highly reliable.

The embodiment described above is provided for easier understanding of the present invention and is not provided to place any limitations on the invention. Therefore, each element disclosed in the above-mentioned embodiment includes all design changes and equivalents in the technical scope of the present invention.

For example, in the above-mentioned embodiment, the external electrode chip 16 was mounted on the antenna substrate 111 in step 4 and the sheath 18a having the hole 181 formed in step 5 was bonded to the antenna substrate 111 in step 6. The steps 4 and 6, however, are interchangeable.

More specifically, the sheath 18a having the hole 181 formed in step 5 may be bonded to the antenna substrate 111 as in step 6, and, then, the external electrode chip 16 may be mounted in the hole 181 formed on the sheath 18a as in step 4. Even in such a case, when the external electrode chip 16 is mounted, the patterned connection leads 17 are exposed through the hole 181 without any foreign materials or without being excessively scraped off. Consequently, the electrical connection and the mechanical bonding between the external electrode chip 16 and the patterned connection leads 17 (and by extent, the antenna substrate 111) become extremely reliable.

EXAMPLES

The present invention is described in detail by referring to examples.

Example 1

On both surfaces of a polyimide antenna substrate 111, antenna leads 12 and a capacitor 13 were formed by etching of a copper layer. An IC chip 141 was mounted on a predetermined position on the antenna substrate 111. Then, the IC chip 141 was sealed with a metal (stainless steel) plate 143 with a thickness of 50 µm by applying a sealing resin 142 composed of a heat-curable, one-component epoxy adhesive. Subsequently, an external electrode chip 16 was bonded to a predetermined position on the antenna substrate 111. The adhesive was a nitrile/phenolic adhesive film with a thickness of 50 µm. To achieve electric connection, metal bumps 165 formed on the inner surface of the external electrode chip 16 were buried in the conductive portions of the patterned connection leads 17 on the polyimide antenna substrate 111. Then, the capacitor 13 on the antenna substrate 111 was trimmed to a predetermined resonance frequency.

An IC card 1 was produced by heat-sealing both surfaces of the antenna substrate 111 with an unstretched polyethylene terephthalate sheath 18a having a groove as an escape for the IC chip package 14 and a hole 181 for mounting the external electrode chip 16 and an unstretched polyethylene terephthalate sheath 18b not having holes.

Fifty IC cards 1 were produced to determine the yields based on conductivity and adhesiveness of each external electrode chip 16. The yield based on conductivity was evaluated by measuring the resistance of the external electrode chip 16. The yield based on adhesiveness was evaluated by whether or not the external electrode chip 16 was separated from the IC card when the IC card was bent in the vicinity of the external electrode chip 16. In addition, the overall yield of the IC card was defined by the percentage of the IC cards satisfying the tests for both conductivity and adhesiveness.

Example 2

On both surfaces of a polyimide antenna substrate 111, antenna leads 12 and a capacitor 13 were formed by etching of a copper layer. An IC chip 141 was mounted on a predetermined position on the antenna substrate 111. Then, the IC chip 141 was sealed with a metal (stainless steel) plate 143 with a thickness of 50 µm by applying a sealing resin 142 composed of a heat-curable, one-component epoxy adhesive on the IC chip 141. Subsequently, the capacitor 13 on the antenna substrate 111 was trimmed to a predetermined resonance frequency.

An IC card 1 was produced by heat-sealing both surfaces of the antenna substrate 111 with an unstretched polyethylene terephthalate sheath 18a having a groove as an escape for the IC chip package 14 and a hole 181 for mounting the external electrode chip 16 and an unstretched polyethylene terephthalate sheath 18b not having holes.

Then, the external electrode chip 16 was bonded on a predetermined position on the antenna substrate 111 through the hole 181 on the sheath 18a. The adhesive was a nitrile/phenolic adhesive film with a thickness of 50 µm. To achieve electric connection, metal bumps 165 formed on the inner surface of the external electrode chip 16 were buried in the conductive portions of the patterned connection leads 17 on the polyimide antenna substrate 111.

An IC card 1 produced as described above was evaluated as in Example 1.

Comparative Example 1

On both surfaces of a polyimide antenna substrate 111, antenna leads 12 and a capacitor 13 were formed by etching of a copper layer. An IC chip 141 was mounted on a predetermined position on the antenna substrate 111. Then, the IC chip 141 was sealed with a metal (stainless steel) plate 143 with a thickness of 50 µm by applying a sealing resin 142 composed of a heat-curable, one-component epoxy adhesive on the IC chip 141. Then, the capacitor 13 on the antenna substrate 111 was trimmed to a predetermined resonance frequency.

An IC card 1 was produced by heat-sealing both surfaces of the antenna substrate 111 with an unstretched polyethylene terephthalate sheath 18a having a groove as an escape for the IC chip package 14 and an unstretched polyethylene terephthalate sheath 18b not having holes.

Next, a predetermined position of the sheath 18a was spot faced with a machine to a predetermined depth, and the external electrode chip 16 was buried in this spot faced opening with an adhesive. The adhesive was a nitrile/phenolic adhesive film with a thickness of 50 µm. To achieve electric connection, metal bumps 165 formed on the inner surface of the external electrode chip 16 were buried in the conductive portions of the patterned connection leads 17 on the polyimide antenna substrate 111.

The IC card 1 produced as described above was evaluated as in Example 1.

The results of Examples 1 and 2 and Comparative Example 1 are shown in Table 1.

TABLE 1

|  | Yield Based on Conductivity | Yield Based on Adhesiveness | Overall Yield |
| --- | --- | --- | --- |
| Example 1 | 50/50 | 49/50 | 49/50 |
| Example 2 | 49/50 | 50/50 | 49/50 |
| Comparative Example 1 | 36/50 | 33/50 | 28/50 |

In Comparative Example 1, the yields based on conductivity and adhesiveness are both about 70% and the overall yield is less than 60%. In contrast, the overall yield in Examples 1 and 2 is 98%. The results of Examples 1 and 2 show that the overall yield improves greatly in comparison with Comparative Example 1.

In Examples 1 and 2, the antenna substrate 111 is composed of polyimide, the antenna leads 12 and the capacitor 13 are composed of copper, and the sheaths 18 are composed of unstretched polyethylene terephthalate. It is, however, by using any material indicated in the above-mentioned preferred description of the present invention, the yields equivalent to Examples 1 and 2 can be achieved.

What is claimed is:

1. A method for making an IC card comprising the steps of:
    forming antenna leads and connection leads on an antenna substrate having a first side and a second side;
    mounting an IC chip on the first side of the antenna substrate such that the IC chip is electrically connected to the antenna substrate via the antenna leads and the connection leads;
    mounting an external electrode chip having an external electrode on the first side of the antenna substrate such that the external electrode chip is electrically connected to the antenna substrate via the connection leads; and
    disposing a sheath having a hole on the antenna substrate, whereby
    the external electrode chip is disposed in the hole and the external electrode is exposed at the surface of the sheath.

2. The method for making an IC card according to claim 1, wherein, the external electrode chip and the IC chip are mounted on the antenna substrate and then the sheath is disposed on the antenna substrate.

3. The method for making an IC card according to claim 1, wherein, the IC chip is mounted on the antenna substrate, the sheath is disposed on the antenna substrate, and then the external electrode chip is mounted on the antenna substrate.

4. The method for making an IC card according to claim 1, wherein the external electrode chip has projection terminals on a surface opposite to the surface having the external electrode, the projection terminals electrically connected to the connection leads.

5. An IC card comprising:
   an antenna substrate having patterned antenna leads and connection leads for non-contact communication, the antenna substrate having first and second surfaces;
   a first sheath layer disposed above the first surface of the antenna substrate, the first sheath layer having a hole;
   an external electrode chip mounted in the hole on the first surface of the antenna substrate, the external electrode chip having an external electrode exposed at the surface of the first sheath layer; and
   an IC chip electrically connected to the antenna substrate and the external electrode via the connection leads, the IC chip mounted on the first surface of the antenna substrate.

6. The IC card according to claim 5, wherein the first sheath layer is bonded to the antenna substrate with an adhesive sheet.

7. The IC card according to claim 5 further comprising a second sheath layer disposed on the second surface of the antenna substrate.

* * * * *